(12) United States Patent
Telfer

(10) Patent No.: US 6,193,023 B1
(45) Date of Patent: Feb. 27, 2001

(54) ROTOR WITH ALTERNATE RIB DESIGNS

(75) Inventor: Larry K. Telfer, Pinckney, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/060,094

(22) Filed: Apr. 14, 1998

Related U.S. Application Data

(60) Provisional application No. 60/068,587, filed on Dec. 23, 1997.

(51) Int. Cl.⁷ ........................................ F16D 55/02
(52) U.S. Cl. ........................ 188/71.6; 188/264 A
(58) Field of Search ................. 188/71.6, 218 XL, 188/264 A, 264 AA; 192/70.12, 113.1, 113.2

(56) References Cited

U.S. PATENT DOCUMENTS

| | | | |
|---|---|---|---|
| 2,197,232 | * 4/1940 | Wood | 192/113.1 |
| 3,730,304 | * 5/1973 | Buyze | 188/218 XL |
| 4,250,979 | * 2/1981 | Kawaguichi | 188/71.6 |
| 5,188,203 | * 2/1993 | Winter | 188/218 XL |
| 5,544,726 | * 8/1996 | Topouzian et al. | 188/264 A |

* cited by examiner

Primary Examiner—Robert J. Oberleitner
Assistant Examiner—Pamela J. Rodriguez
(74) Attorney, Agent, or Firm—Marshall & Melhorn, LLC

(57) ABSTRACT

The invention is directed to a brake rotor including a central hat section, a peripheral annular friction section having a pair of annular spaced apart friction plates, and plurality of posts extending between said friction plates. The posts include a plurality of first posts having an elongated cross sectional shape, and a plurality of second posts having a circular cross sectional shape. The posts are arranged in a plurality of circumferentially extending rows and radially extending columns to form vents for cooling the rotor.

20 Claims, 4 Drawing Sheets

ROTOR WITH ALTERNATE RIB DESIGNS

RELATED APPLICATION

This application claims the benefit of U.S. Provisional Application No. 60/068,587, filed Dec. 23, 1997. The provisional application, Ser. No. 60/068,587, is hereby incorporated by reference in its entirety.

BACKGROUND OF INVENTION

The present invention relates to a method of cooling a brake rotor and specifically for varying the angles of the vents in a rotor friction section to change the air flow through the vents for cooling the rotor.

Wheeled vehicles are typically slowed and stopped with a braking system that generates frictional forces. Many braking systems include a rotor attached to one or more of the vehicle wheels for rotation therewith, and a caliper assembly secured to a non-rotating component of the vehicle, such as the vehicle frame. The rotor includes an annular peripheral friction section having friction surfaces disposed on opposite sides. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving friction surfaces, frictional forces are created which oppose the rotation of the wheels and slow the vehicle. The friction converts the vehicle's kinetic energy into large quantities of heat, much of which is absorbed by the friction surfaces and conducted throughout the rotor.

It is important to dissipate the heat and cool the rotor. If the rotor is not adequately cooled, the heat generated during braking can build up in the rotor reducing braking performance by creating longer stopping distances, shorten the life of the rotor, or even cause brake failure. The rotor also helps to keep the brake pads cool by absorbing the braking heat and moving it away from the pads. However, the rotor can only absorb a finite amount of heat and if it is not cooled effectively it will absorb less and less heat, causing the brake pads to overheat and thus reducing braking performance and shortening the life of the brake pads.

Rotors are commonly cooled using moving air which absorbs the heat from the rotor and carries it away. It is known to "ventilate" the rotors by forming passages or vents between the friction surfaces to allow cooling air to pass through. These ventilated rotors typically include friction surfaces formed on a pair of annular friction plates joined together by spacers or posts in a mutually parallel, spaced apart relationship to form spaces or vents therebetween. The vents are open at the radially inner and outer edges of the friction plates to form air passages between the friction plates. As the vented rotor turns, air moves through the vents between the friction surfaces and absorbs heat from the friction plates to cool the rotor.

The cooling effectiveness of the vents is proportional to the quantity of air moved through them. The more air the vents move past the rotor surfaces, the more heat that is dissipated and the greater the cooling effects. Therefore, it is desirable to move as much air as possible through the vents. The shapes, spacing and orientation of the posts determine the amount of air which passes through the vents. It is desirable to provide the optimum shape, spacing and orientation of posts to maximize the airflow through the vents.

SUMMARY OF THE INVENTION

The invention is directed to a ventilated rotor having annular friction plates joined together by spacers or posts in a mutually parallel, spaced apart relationship to form spaces or vents therebetween. The vents are open at the radially inner and outer edges of the friction plates to allow air to pass between the friction plates and cool the rotor as it turns. The posts include a plurality of first posts having an elongated cross sectional shape, and a plurality of second posts having a circular cross sectional shape. The posts are arranged in a plurality of circumferentially extending rows and radially extending columns to form vents for cooling the rotor.

One embodiment of the rotor includes posts arranged in a plurality of radially spaced first and second rows. The first rows are interspersed with the second rows in alternating fashion. The posts of the first rows are spaced to form radially extending first columns and the posts of the second rows are spaced to from radially extending second columns. The first and second columns are alternately disposed along the circumferential direction of the friction plates.

A second embodiment of the rotor includes posts being arranged in a plurality of radially spaced rows such that the centers of the posts in any particular row are all spaced the same distance from the center of the rotor. The posts are also arranged in a plurality of circumferentially spaced columns such that radially extending vents are formed between the columns.

A third embodiment of the rotor includes a plurality of first posts extending between the friction plates and having elongated cross sectional shapes having centers and extending along axes. The first posts are arranged in a first row such that the centers of the posts are all spaced the same distance from the center of the rotor. The rotor also includes a plurality of second posts extending between the friction plates and having circular cross sectional shapes with centers. The second posts are arranged in a plurality of second rows such that the centers of the posts in a particular second row are all spaced the same distance from the center of the rotor. The plurality of second rows are disposed radially inwardly from the first row forming radially extending columns such that the columns include a single post from the first row and a pair of second posts from each of the second rows.

A fourth embodiment of the rotor includes a plurality of first posts extending between the friction plates and having elongated cross sectional shapes having centers and extending along axes. The first posts are arranged in a plurality of first rows such that the centers of the posts in a particular first row are all spaced the same distance from the center of the rotor. The rotor further includes a plurality of second posts having circular cross sectional shapes with centers. The second posts are arranged in a plurality of second rows such that the centers of the posts in a particular second row are all spaced the same distance from the center of the rotor. The plurality of first and second rows are interspersed in alternating fashion to form radially extending columns such that the columns include a single first post from each of the first rows and a pair of second posts from each of the second rows.

A fifth embodiment of said brake rotor including a central hat section, a peripheral annular friction section having a pair of annular spaced apart friction plates, and a plurality of posts extending between said friction plates. The posts have V-shaped cross sectional shapes with an open end and a closed end. The posts are arranged in a row extending around at least a portion of the circumference of said friction plates.

A sixth embodiment of said brake rotor including a central hat section, a peripheral annular friction section having a pair of annular spaced apart friction plates, and a plurality of posts extending between said friction plates. The posts have S-shaped cross sectional. The posts are arranged in a row extending around at least a portion of the circumference of said friction plates.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

Figure 1:
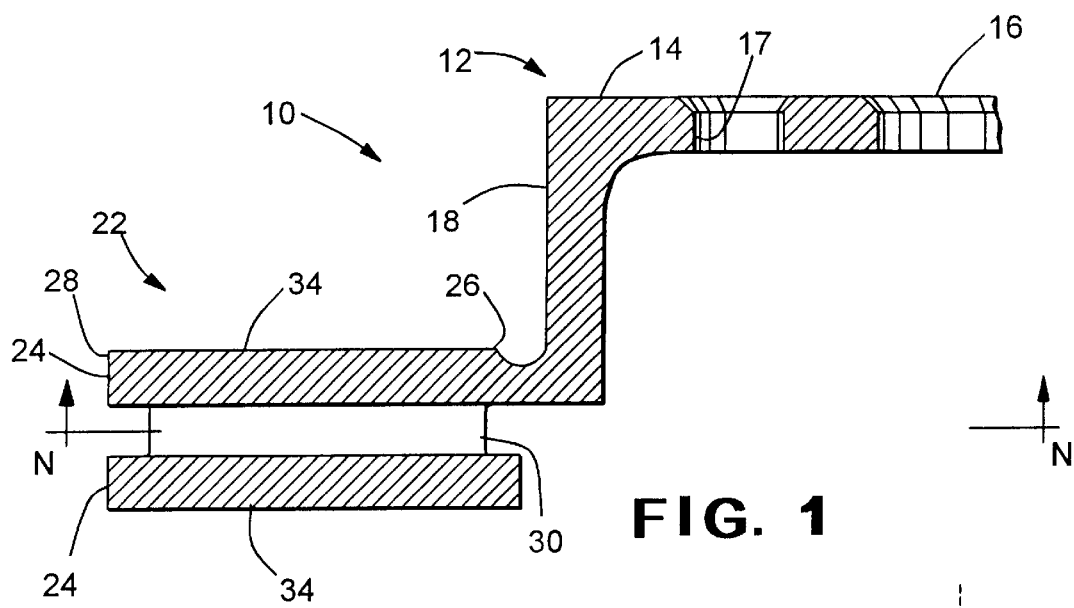
FIG. 1 is a sectional view of a portion of a vented rotor showing having a section line N—N through the posts.

Referring now to the drawings, there is illustrated in FIG. 1 a vented rotor formed in accordance with the invention, denoted generally by the reference numeral 10. The rotor 10 is of the type adapted for use in conjunction with a variety of mechanical devices, such as caliper disc brakes and the like. The rotor 10 includes a central hub or hat section 12 having a mounting face 14. A central pilot aperture 16 is provided in the central mounting face 14 in to which a spindle hub or the like (not shown) may be closely received when the hat section is mounted to a drive member. A plurality of circumferentially spaced apart fastener apertures 17 are disposed in the mounting face 14 in which fasteners (not shown) may be received to mount the rotor 10 on an associated drive mechanism in the conventional manner. The hat section 12 also includes a cylindrical shoulder or hat wall 18 extending axially from the periphery of the mounting face 14.

The rotor 10 also includes a ring-shaped friction section 22 extending radially outwardly from the wall 18 of the hat section 10. The friction section 22 includes a pair of annular friction plates 24 having radially inner edges 26 and radially outer edges 28. The friction plates 24 are joined together by spacers or posts 30 in a mutually parallel, spaced apart relationship to form spaces or vents 32 therebetween. The vents 32 are open at the inner edges 26 and the outer edges 28 of the friction plates to form air passages between the friction plates. Flat annular friction surfaces 34 are located on opposite, outwardly facing sides of the friction plates 24. The friction surfaces 34 are adapted to interface with associated friction members (not shown), such as brake pads or the like. Optionally cross vents (not shown) may be formed through the friction plates 24 between the posts 30 or through the hat wall 18 to increase the cooling air passing by the rotor surfaces.

Figure 2:
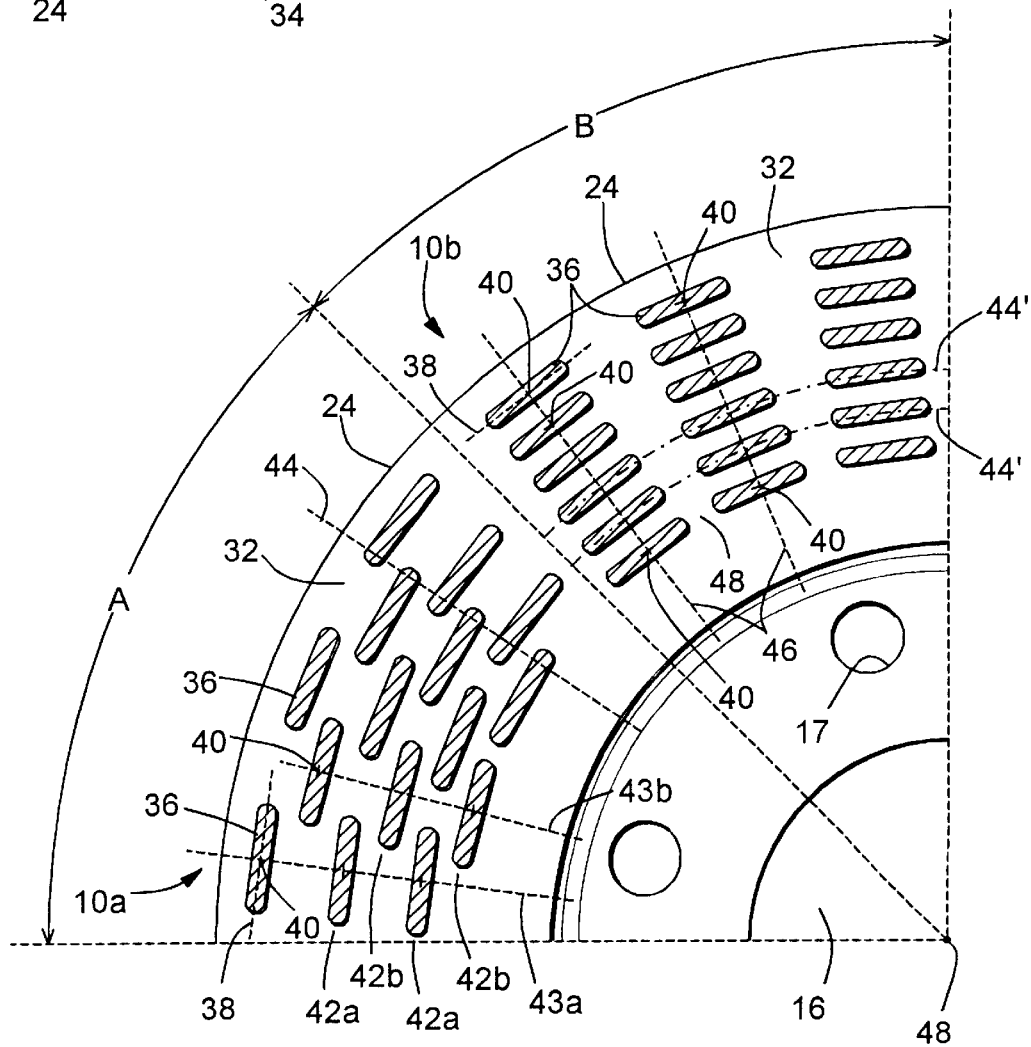
FIG. 2 is a partial section view of a portion of a vented rotor illustrating a first embodiment of the rotor defined by arc A, and a second embodiment of the rotor defined by arc B taken along the sectional line N—N in FIG. 1 in accordance with the invention.

The following rotor embodiments shown in FIGS. 2 through 5 illustrate configurations of posts in accordance with the invention as shown by cross section taken between the friction plates 24. Referring now to FIG. 2, a first embodiment of a vented rotor 10a is illustrated in the portion marked as arc A. The rotor 10 includes posts 36 disposed between the friction plates 24 to form vents 32. Each of the posts 36 preferably has an elongated cross sectional shape which extends along an axis 38 and has a center 40 and are hereinafter call elongated posts 36. The elongated posts 36 are oriented such that the axes 38 extend circumferentially. The elongated posts 36 are arranged in circumferentially extending rows 42. The centers 40 of the posts 36 in any particular row 42 are all spaced approximately the same distance from the center of the rotor 48. The rows 42 extend around at least a portion of the friction ring 24 and preferably around the entire friction ring.

The rows 42 include a plurality of first rows 42a, and second rows 42b. The rows 42a, 42b are interspersed such that they alternate from the first row 42a to the second row 42b to the first row 42a along the radius of the friction section 22. The posts 36 in the first rows 42a are circumferentially spaced such that the post centers 40 are aligned along first radial columns 43a. The elongated posts 36 of the second rows 42b, are circumferentially spaced such that the post centers 40 are aligned along second radial columns 43b. The columns 43a, 43b are interspersed such that they alternate from the first column 43a to the second column 43b to the first column 43a around the circumference of the friction section 22. The elongated posts 36 in first and second columns 43a, 43b preferably overlap each other such that a radially extending line 44 intersects the elongated posts 36 of adjacent first and second columns 43a, and 43b.

Referring again to FIG. 2, a second embodiment of a vented rotor 10b is illustrated in the portion of the rotor marked as arc B. The rotor 10b includes elongated posts 36 similar to those described above, disposed between the friction plates 24 to form vents 32. The posts 36 are oriented such that each axis 38 extends generally circumferentially along the friction rings 24. The posts 36 are arranged in radially spaced apart rows 44 which extend around a portion of the friction ring 24 and preferably around the entire friction ring. The posts 36 in any particular row 44 are disposed such that all of the centers 40 are spaced approximately the same distance from the center of the rotor 48 as described above.

The posts 36 are also circumferentially spaced along each row such that the post centers 40 are aligned along radial columns 46. The radial columns 46 are circumferentially spaced such that radially extending vents 48 are formed between adjacent radial columns 46.

Figure 3:
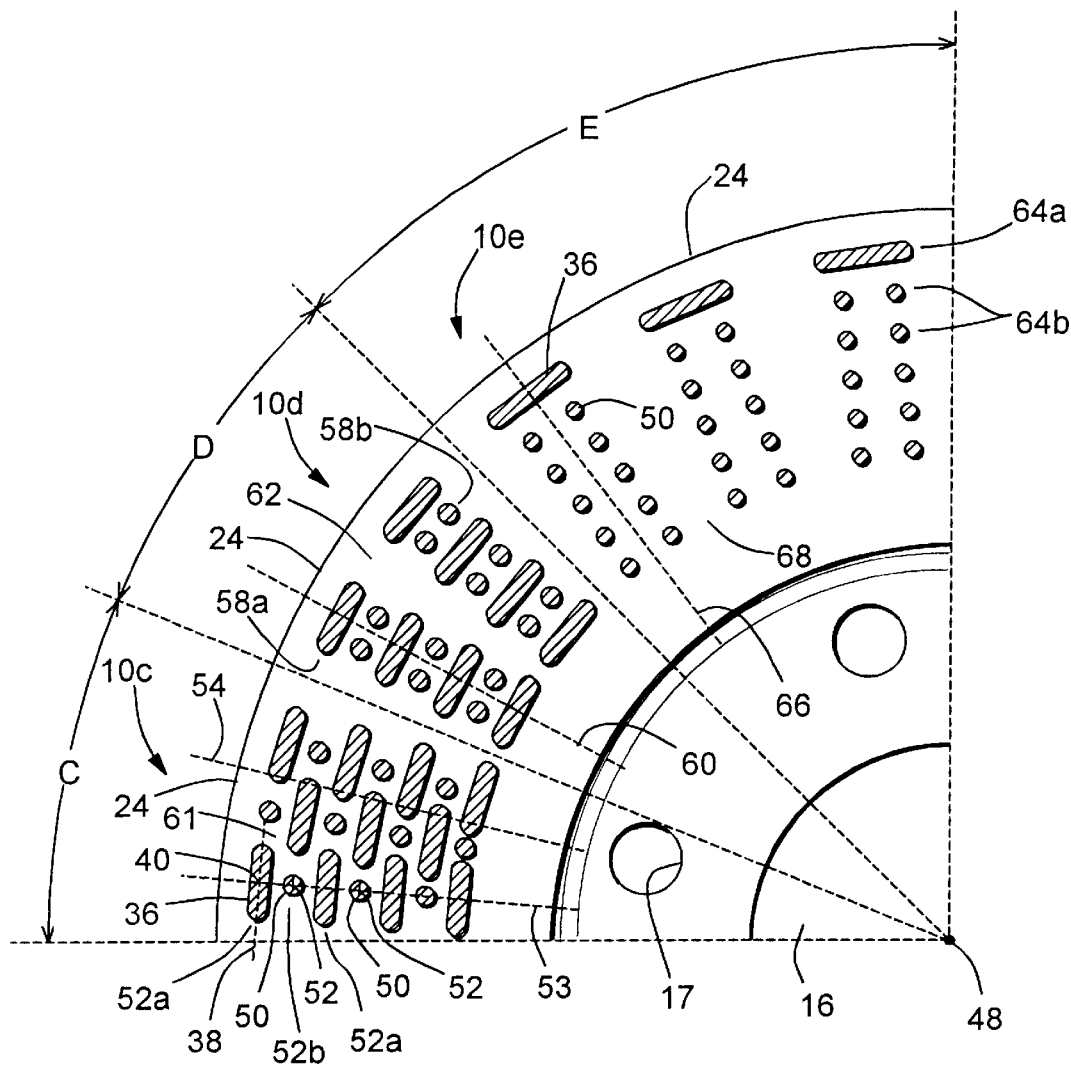
FIG. 3 is a partial section view of a portion of a vented rotor illustrating a third embodiment of the rotor defined by arc C, a fourth embodiment of the rotor defined by arc D, and a fifth embodiment of the rotor defined by arc E taken along the sectional line N—N in FIG. 1 in accordance with the invention.

Referring now to FIG. 3, a third embodiment of a vented rotor 10c is illustrated in the portion marked as arc C. The rotor 10c includes elongated posts 36 described above, and posts 50 having circular cross sectional shapes with centers 52 (hereinafter referred to as circular posts). The elongated posts 36 and circular posts 50 are disposed between the friction plates 24 to form vents 61 therebetween. The posts 36 and 50 are arranged in radially spaced apart rows 52. Each row 52 extends circumferentially around at least a portion of the friction plates 24 of the rotor 10c and preferably completely around the friction plates 24. In each row 52, the posts 36, and 50 are arranged such that the post centers 40, and 52 are all the same radial distance from the center of the rotor 48.

The rows 52 include a first row 52a and a second row 52b. The first row 52a includes both elongated posts 36 and circular posts 50 arranged alternately around the row such that a circular post is disposed adjacent an elongated post which is disposed adjacent another circular post. The second row 52b includes a similar alternately arranged configuration of elongated and circular posts 36 and 50. The first and second rows 52a, 52b are interspersed such that they alternate from the first row 52a to the second row 52b to the first row 52a along the radius of the friction section 22.

The posts 36, 50 of each successive row are arranged such that the centers 40, 54 form radially extending columns 53. The elongated posts 36 and circular posts 50 are interspersed such that they alternate from elongated post to circular post to elongated post along each column 53. The ends of each elongated post 36 of one column may circumferentially overlap with the end of the elongated posts in the adjacent column (and row) such that a radial line 54 extending outwardly along the friction plate 24 intersects all of the elongated posts from adjacent columns. Alternatively, the elongated posts 36 may not overlap with 25 the elongated posts of adjacent columns.

Referring again to FIG. 3, a fourth embodiment of a vented rotor 10d is illustrated in the portion marked as arc D. The rotor 10d includes elongated posts 36 and circular posts 50 disposed between the friction plates 24 to form vents 56 therebetween. The posts 36, and 50 are arranged in radially spaced apart rows 58. Each row 58 extends circumferentially around at least a portion of the friction plates 24 of the rotor 10d and preferably completely around the friction plates 24.

The rows 58 include a first row 58a having only elongated posts 36, and a second row 58b having only circular posts 50. The posts of the first and second rows 58a, 58b are arranged such that the centers of the posts of any particular row are spaced the same radial distance from the center 48, as described above. The first and second rows 58a, 58b are disposed adjacent each other in alternating fashion.

The posts 36, and 50 are also arranged in radially extending columns 60, with each column including a single elongated post of the first row 58a and a pair of circular posts of the second row 58b. The radial columns 60 are circumferentially spaced such that radially extending vents 62 are formed between adjacent radial columns 60.

Referring again to FIG. 3, a fifth embodiment of a vented rotor 10e is illustrated in the portion marked as arc E. The rotor 10e includes elongated posts 36 and circular posts 50 disposed between the friction plates 24 to form vents 56 therebetween. The posts 36, and 50 are arranged in radially spaced apart rows 64. Each row 64 extends circumferentially around at least a portion of the friction plates 24 of the rotor 10e and preferably completely around the friction plates 24.

The rows 64 include a first row 64a having only elongated posts 36, and a plurality of second rows 64b having only circular posts 50. The first row 64a extends along the radially outer edge 28 of the friction plate 24, and the plurality of second rows 64b are disposed adjacent and radially inwards from the first row. The posts of the first and second rows 64a, 64b are arranged such that the centers of the posts of any particular row are spaced the same radial distance from the center 48, as described above.

The posts 36, and 50 are also arranged in radially extending columns 66, with each column including a single elongated post of the first row 64a and a pair of circular posts of the second rows 64b. The radial columns 66 are circumferentially spaced such that radially extending vents 68 are formed between adjacent radial columns.

Figure 4:
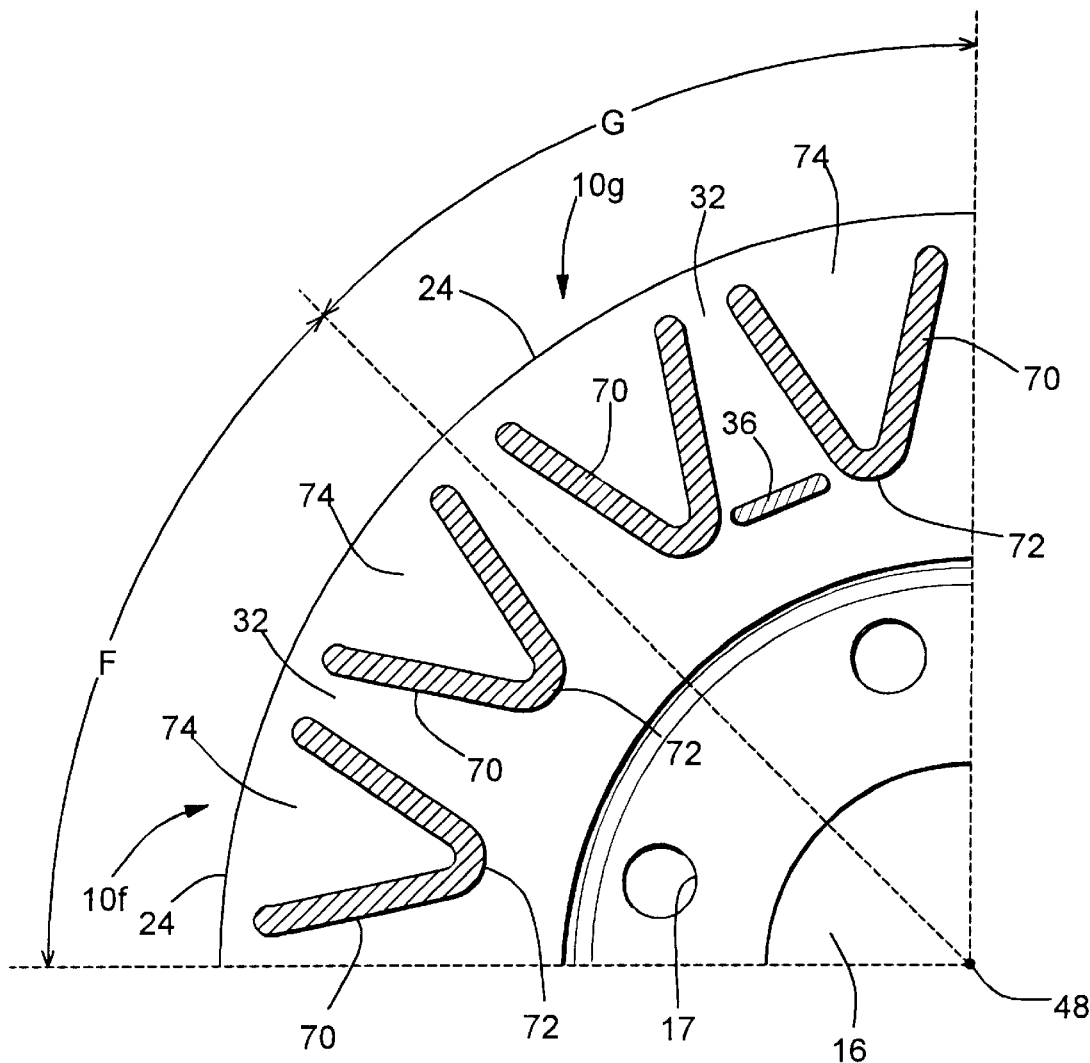
FIG. 4 is a partial section view of a portion of a vented rotor illustrating a sixth embodiment of the rotor defined by arc F, and a seventh embodiment of the rotor defined by arc G taken along the sectional line N—N in FIG. 1 in accordance with the invention.

Referring now to FIG. 4, a sixth embodiment of a vented rotor 10f is illustrated in the portion marked as arc F. The rotor 10f includes posts 70 having a V-shaped cross sectional shape with a closed end 72 and an open end 74. The posts 70 are arranged in a single row around the circumference of the friction rings 24 such that the open end of the V-shaped posts extend radially outwardly. The row of posts 70 extends circumferentially around at least a portion of the friction plates 24 of the rotor 10f and preferably completely around the friction plates 24.

Referring again to FIG. 4, a seventh embodiment of a vented rotor 10g is illustrated in the portion marked as arc G. The rotor 10g includes posts 70 having a V-shaped cross sectional shape with a closed end 72 and an open end 74. The posts 70 are arranged in a single row around the circumference of the friction rings 24 such that the open end of the V-shaped posts extend radially outwardly. An elongated post 36 is disposed between each V-shaped post 70 adjacent the closed ends 72. The row of posts 70 and 36 extends circumferentially around at least a portion of the friction plates 24 of the rotor 10f and preferably completely around the friction plates 24.

Figure 5:
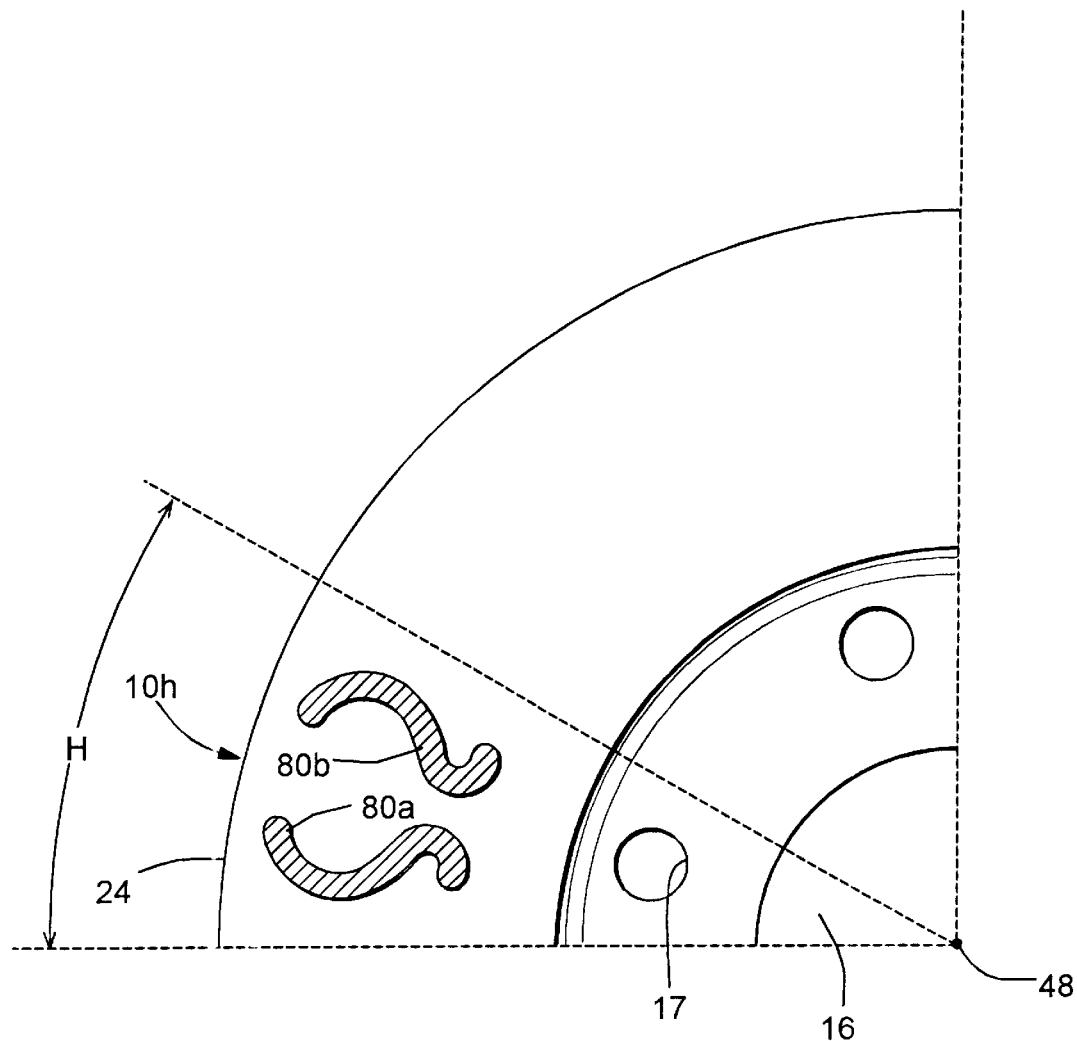
FIG. 5 is a partial section view of a portion of a vented rotor illustrating an eighth embodiment of the rotor defined by arc H taken along the sectional line N—N in FIG. 1 in accordance with the invention.

Referring now to FIG. 5, a eighth embodiment of a vented rotor 10g is illustrated in the portion marked as arc H. The rotor 10h includes posts 80a having an S-shaped cross sectional shape, and posts 80b having a "backwards" S-shaped cross sectional shape as seen from FIG. 5. The posts 80a, 80b are arranged in a single row around the circumference of the friction rings 24 in an alternating fashion such that an S-shaped post 80a is adjacent a "backwards" S-shaped post 80b, which is adjacent an S-shaped post 80b. The row of alternating posts 80a, 80b extends circumferentially around at least a portion of the friction plates 24 of the rotor 10h and preferably completely around the friction plates 24.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A brake rotor comprising:
a central hat section;
a peripheral friction section extending from said hat section and including a pair of annular spaced apart friction plates, each of said pair of friction plates having a radially inner edge and a radially outer edge; and
a plurality of circumferentially spaced apart posts extending between said friction plates and having V-shaped cross sectional shapes, said posts having an open end connected to said pair of friction plates and a closed end connected to said pair of said friction plates and wherein said posts are disposed between said radially inner edge and said radially outer edge of said pair of friction plates.

2. The brake rotor defined in claim 1 wherein said posts are arranged in a row extending around at least a portion of the circumference of said friction plates.

3. The brake rotor defined in claim 2 wherein the open ends of at least a portion of said plurality of V-shaped posts face radially outwards.

4. The brake rotor defined in claim 3 wherein the open end of each of said V-shaped posts is disposed adjacent the radially outer edge of said friction plates and the closed end of each of said V-shaped posts is disposed adjacent the radially inner edge of said friction plates.

5. The brake rotor defined in claim 1 further including a plurality of elongated posts spaced apart from said V-shaped posts.

6. The brake rotor defined in claim 5 wherein said elongated posts have a rectangular cross sectional shape.

7. The brake rotor defined in claim 6 wherein at least one of said elongated posts is interspersed between each of said V-shaped posts.

8. The brake rotor defined in claim 7 wherein said elongated posts are disposed adjacent the radially inner edge of said pair of friction plates.

9. The brake rotor defined in claim 1 wherein said posts are arranged in a row extending around the entire circumference of said friction plates.

10. A brake rotor comprising:

a central hat section;

a peripheral friction section extending from said hat section and including a pair of annular spaced apart friction plates, each of said pair of friction plates having a radially inner edge and a radially outer edge; and a plurality of circumferentially spaced apart posts extending between said friction plates and having V-shaped cross sectional shapes, wherein least a portion of said plurality of posts include an open end connected to said pair of friction plates and disposed between said radially inner edge and said radially outer edge and a closed end connected to said pair of friction plates and disposed between said radially inner edge and said radially outer edge.

11. The brake rotor defined in claim 10 wherein said posts are arranged in a row extending around at least a portion of the circumference of said friction plates.

12. The brake rotor defined in claim 11 wherein said posts are arranged in a row extending around the entire circumference of said friction plates.

13. The brake rotor defined in claim 11 wherein the open end of each of said posts faces radially outwards and is disposed adjacent the radially outer edge of said pair of friction plates, and the closed end is disposed adjacent the radially inner edge of said pair of friction plates.

14. The brake rotor defined in claim 10 further including a plurality of elongated posts each having a rectangular cross sectional shape.

15. The brake rotor defined in claim 14 wherein at least one of said elongated posts is interspersed between each of said posts having V-shaped cross sectional shapes.

16. The brake rotor defined in claim 15 wherein said elongated posts are disposed adjacent the radially inner edges of said friction plates.

17. A brake rotor comprising:

a central hat section;

a peripheral friction section extending from said hat section and including a pair of annular spaced apart friction plates, each of said pair of friction plates having a radially inner edge and a radially outer edge;

a plurality of circumferentially spaced apart posts extending between said friction plates and having V-shaped cross sectional shapes, wherein least a portion of said plurality of posts having an open end connected to said pair of friction plates and disposed between said radially inner edge and said radially outer edge and a closed end connected to said pair of friction plates and disposed between said radially inner edge and said radially outer edge; and a plurality of elongated posts having rectangular cross sectional shapes, wherein at least one of said plurality of elongated posts are interspaced between said V-shaped posts.

18. The brake rotor defined in claim 17 wherein said posts having V-shaped cross sectional shapes are arranged in a row extending around at least a portion of the circumference of said friction plates.

19. The brake rotor defined in claim 18 wherein said posts having V-shaped cross sectional shapes are arranged in a row extending around the entire circumference of said friction plates.

20. The brake rotor defined in claim 17 wherein said elongated posts are disposed at the radially inner end of said friction plates.

\* \* \* \* \*